US00RE34539E

United States Patent [19]

Aoyama

[11] E Patent Number: Re. 34,539

[45] Reissued Date of Patent: Feb. 8, 1994

[54] ELECTRICAL CONNECTOR

[75] Inventor: Koji Aoyama, Tokyo, Japan

[73] Assignee: AMP Incorporated, Harrisburg, Pa.

[21] Appl. No.: 868,593

[22] Filed: Apr. 14, 1992

Related U.S. Patent Documents

Reissue of:

[64] Patent No.: 5,004,436
Issued: Apr. 2, 1991
Appl. No.: 470,022
Filed: Jan. 25, 1990

[30] Foreign Application Priority Data

Mar. 5, 1989 [JP] Japan ..... 1-52669

[51] Int. Cl.[5] ..... H01R 13/436
[52] U.S. Cl. ..... 439/752; 439/595
[58] Field of Search ..... 439/752, 595, 596

[56] References Cited

U.S. PATENT DOCUMENTS 4,583,805 4/1986 Mantlik ..... 439/595 X
4,752,251 6/1988 Kato et al. ..... 439/752
5,061,210 10/1991 Jinno ..... 439/752
5,071,373 12/1991 Nagasaka et al. ..... 439/752

*Primary Examiner*—Eugene F. Desmond
*Attorney, Agent, or Firm*—Adrian J. LaRue; Timothy J. Aberle

[57] ABSTRACT

An electrical connector comprises a dielectric housing (10) having a plurality of terminal-receiving cavities (11), a dielectric latching member (50) having latching arms (52) extending into the terminal-receiving cavities (11) and including openings (56), first latching means (21, 22, 60, 61) of the housing (10) and the latching member (50) latching the latching member (50) to said housing (10) at a first position so that electrical terminals (100) are inserted through the openings (56) and into the terminal-receiving cavities (11), second latching means (17, 19, 62) and third latching means (23, 24, 67, 68) of the housing (10) and the latching member (50) latching the latching member (50) at a second position in the housing after being moved inwardly and downwardly so that front ends (66) of the latching arms (52) are positioned adjacent contact sections (101) of the terminals (100) thereby latching the terminals in the terminal-receiving cavities.

17 Claims, 7 Drawing Sheets

10
2A
2B
2C
33
36
18
17
14
21
22
28
27
26
29
19
13
15
65
62
64
53
51
23
24
25
12
11
16
32
63
73
52
54
56
59
61
60
55
58
67
50
69
57
70

ELECTRICAL CONNECTOR

Matter enclosed in heavy brackets [ ] appears in the original patent but forms no part of this reissue specification; matter printed in italics indicates the additions made by reissue.

FIELD OF THE INVENTION

The present invention relates generally to an electrical connector, more specifically to an electrical connector provided with a member to latch electrical terminals inserted in terminal-receiving cavities in a housing and to prevent the terminals from slipping out in the direction opposite to the insertion of such terminals.

BACKGROUND OF THE INVENTION

A conventional electrical connector is disclosed in the specification of Japanese UM Publication No. 58470/88 in which a latching member is provided as a means to latch electrical terminals inserted in a plurality of terminal-receiving cavities in a housing to prevent the terminals from slipping out in the direction opposite to the insertion of such terminals. More in detail, the latching member includes flexible latching arms to be inserted in the housing. The latching member is designed to move with respect to the housing between a primary position to a secondary position. In the primary position, terminals may be inserted into respective terminal-receiving cavities. In the secondary position, latching-projection sections of latching arms are moved into engagement with the inner ends of the electrical contact sections at intermediate positions of the terminals inserted in the terminal-receiving cavities. This acts to prevent each terminal from slipping out in the direction opposite to the insertion of such terminal.

However, in such a prior art connector, it requires a relatively strong pushing force to insert the latching arms into the housing to move the latching-projection sections of the latching arms into engagement with the terminals inserted into the terminal-receiving cavities. The reason is that the portions adjacent to the latching projections are forced to be deformed downwardly by sloped surfaces of the upper walls of the terminal-receiving cavities. Also, such forceful insertion is not easy and may cause fatigue and permanent deformation of the latching arms. Moreover, since means for maintaining primary and secondary latching positions are formed at both sides of the latching member and the housing, the secondary latching of the latching member to the housing becomes insufficient at a central part of the connector in its longitudinal direction if the connector is a multi-terminal type and elongated. This, in turn, may cause the latching arms in the central portions to operate improperly.

It is therefore an object of the present invention that the latching arms of the latching member latch the respective terminals in the terminal-receiving cavities without forcing the latching arms to deform in the terminal-receiving cavities. Also, the latching member is positioned at different locations of the housing for the primary and secondary latching positions. In other words, the primary latching means are located at both sides of the housing and latching member while the secondary latch means are located at upper and bottom sections, preferably at the central parts of the housing and the latching member.

SUMMARY OF THE PRESENT INVENTION

In order to solve the above problem, the present invention is directed to an electrical connector comprising a dielectric housing having a plurality of terminal-receiving cavities to receive electrical terminals, and a dielectric latching member having a frame section provided with a plurality of openings corresponding to the number of the terminal-receiving cavities and latching arms extending from the frame section into the housing.

The housing and the latching member are provided with first latching means at both sides of the housing and the latching member for primarily latching the latching member at a first position on the housing. The terminal-receiving cavities and openings are in alignment with one another so that the electrical terminals may be inserted in the terminal-receiving cavities through the openings at the first position. In the movement of the latching member from the first position to the second position, sliding means is provided by the housing and the latching member for moving the latching member forward and downwardly so that the front ends of the latching arms latch the electrical terminals in the terminal-receiving cavities. Second and third latching means are provided at the upper and bottom sections near the rear end between the both sides of the housing and the latching member for secondarily latching the latching member to the housing in the forward and downward directions at the second position.

In a preferred embodiment, the first latching means comprise latching openings formed in both sides of a frame section extending backwardly from the housing, and resilient latching members having hooks formed at both sides of a frame section of the latching member for disposition in the latching openings.

The sliding means comprises in the shown embodiment sliding surfaces positioned at the upper portion of the frame section extending to the back end of the housing and sloped surfaces to slidably engage with the sliding surfaces which are formed at the upper section of the frame section of the latching member.

The second latching means in the preferred embodiment are provided on the upper portion of the frame section extending at the rear end of the housing and on the upper section of the frame section of the latching member. The second latching means comprise resilient latching members having hooks located on the upper portion of the frame section of the housing and latching projections having sloped surfaces on the upper section of the frame section of the latching member over which the latching members slide with the hooks engaging rear surfaces of the latching projections. Similarly, the third latching means in the preferred embodiment comprise resilient latching members having hooks located at the lower section of the frame section of the latching member and the lower portion of the frame section of the housing has grooves along which the latching members move and the hooks pass through openings and engage a front surface of the lower portion of the housing frame section.

In the electrical connector of the present invention as constructed above, the first position of the latching member is reached by slightly pushing the latching member into the housing, where the primary latching is achieved to allow the electrical terminals to be inserted in the terminal-receiving cavities through the respective openings of the latching member. When the latching member is pushed further in the housing, the latching arms move forward and downwardly by the sliding means to reach the second position by the disposition of the ends of the latching arms adjacent contact sections of the respective electrical terminals. At the second position, the second and third latching means provide the secondary latching of the latching member to the housing to prevent forward and backward movement.

BRIEF DESCRIPTION OF THE DRAWINGS

The present invention will be described in detail hereunder by way of example with reference to the drawings.

DETAILED DESCRIPTION OF THE INVENTION

Figure 1:
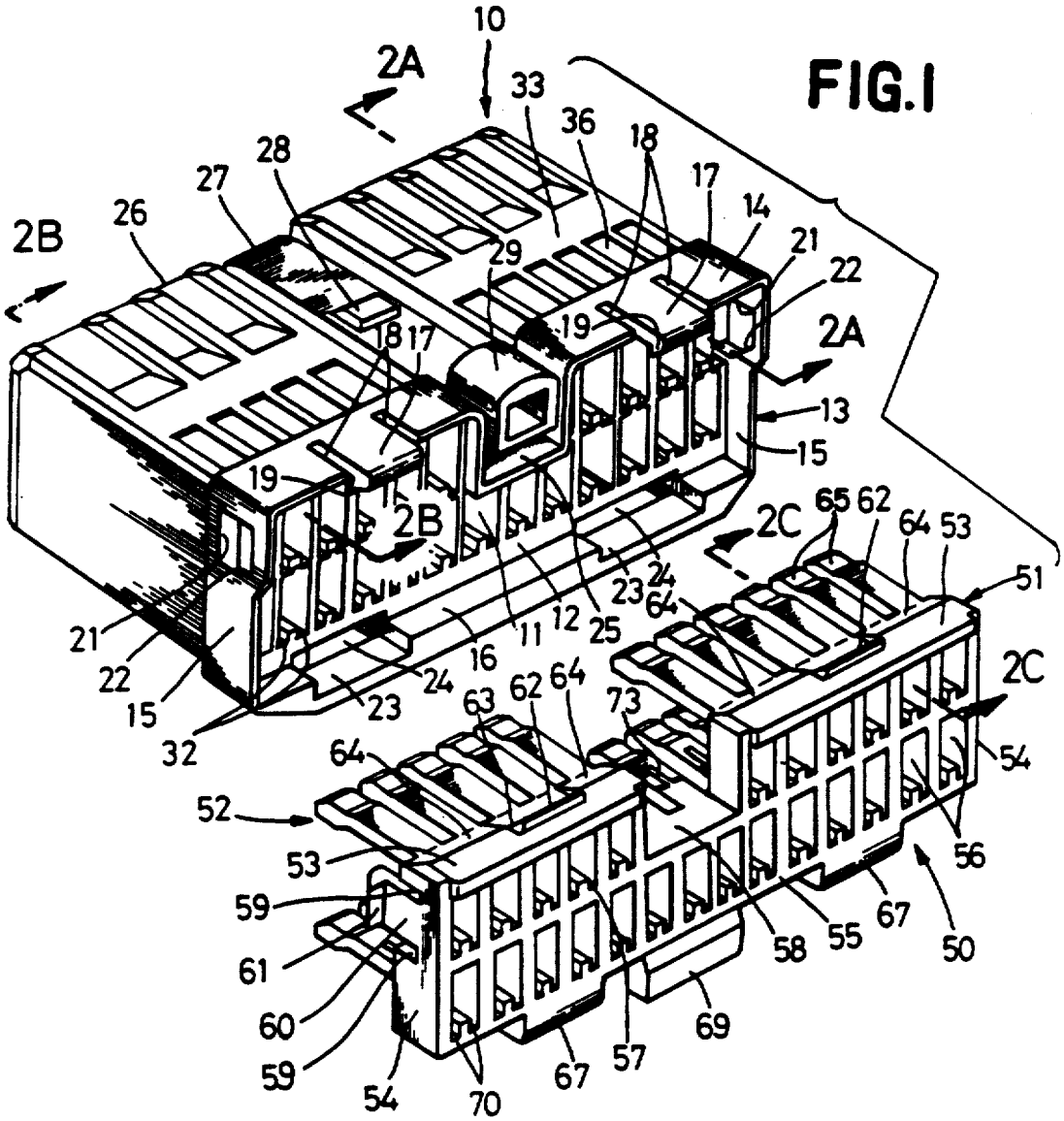
FIG. 1 is an exploded perspective view of the housing and the latching member.
Figure 2A:
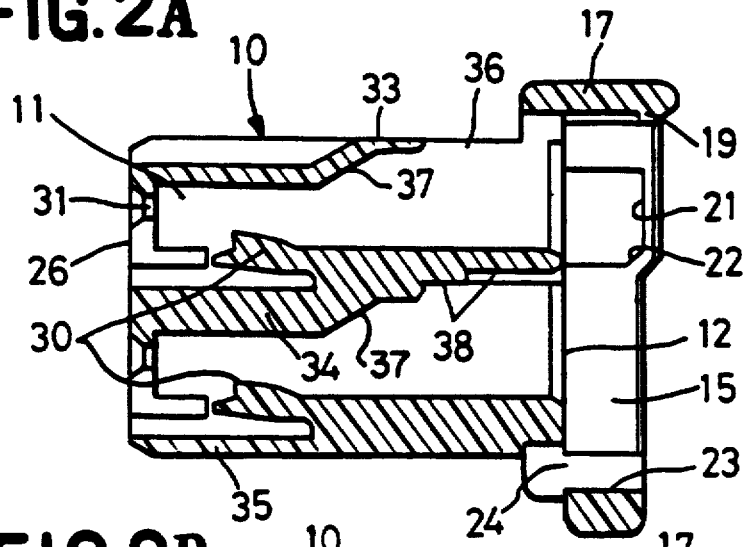
FIG. 2A is a cross-sectional view along line 2A—2A in FIG. 1.
Figure 2B:
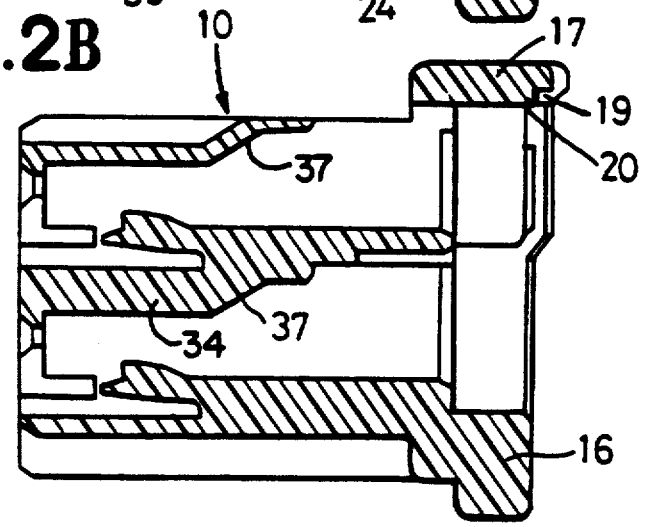
FIG. 2B is a cross-sectional view along line 2B—2B in FIG. 1.

In FIGS. 1, 2A and 2B, the connector includes a housing 10 made from plastic material. The housing 10 contains a large number of terminal-receiving cavities 11 disposed in vertical and horizontal directions and extending from its rear end 12 to its front end 26. The housing 10 has a frame section 13 extending from its rear end and enclosing the rear end thereof.

The frame section 13 comprises upper portion 14, side portions 15 and bottom portion 16. Formed on the upper portion 14 are resilient latching members 17 separated by slits 18 at both sides of each latching member 17. The latching members 17 have downwardly-directed hooks 19. Sliding sections 20 are formed on the lower surface of the upper portion 14 on both sides of the resilient latching members 17 (see FIG. 2B). Latching openings 21 have sloped surfaces 22 are formed in the side portions 15. Grooves 23 are formed in the bottom portion 16. Also formed at the intersection between the grooves 23 and the rear end 12 are openings 24.

Figure 3A:
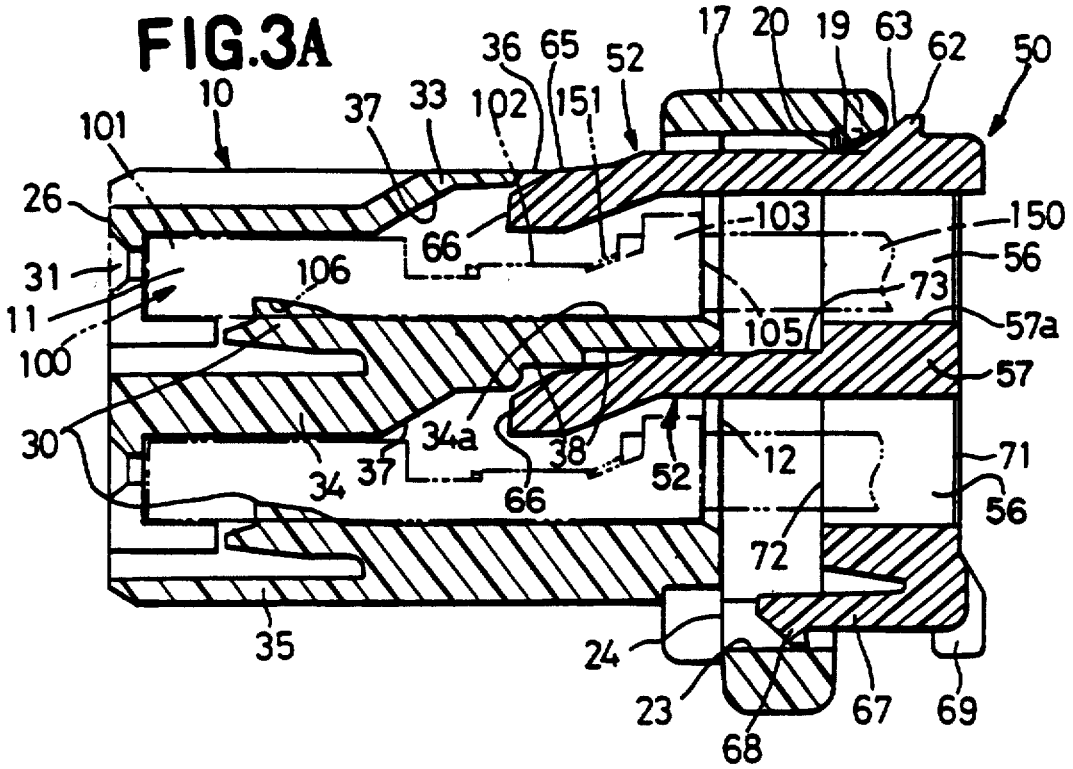
FIGS. 3A through 3E are cross-sectional views to illustrate the steps from the primary latching position to the secondary latching position between the latching member and the housing.
Figure 3B:
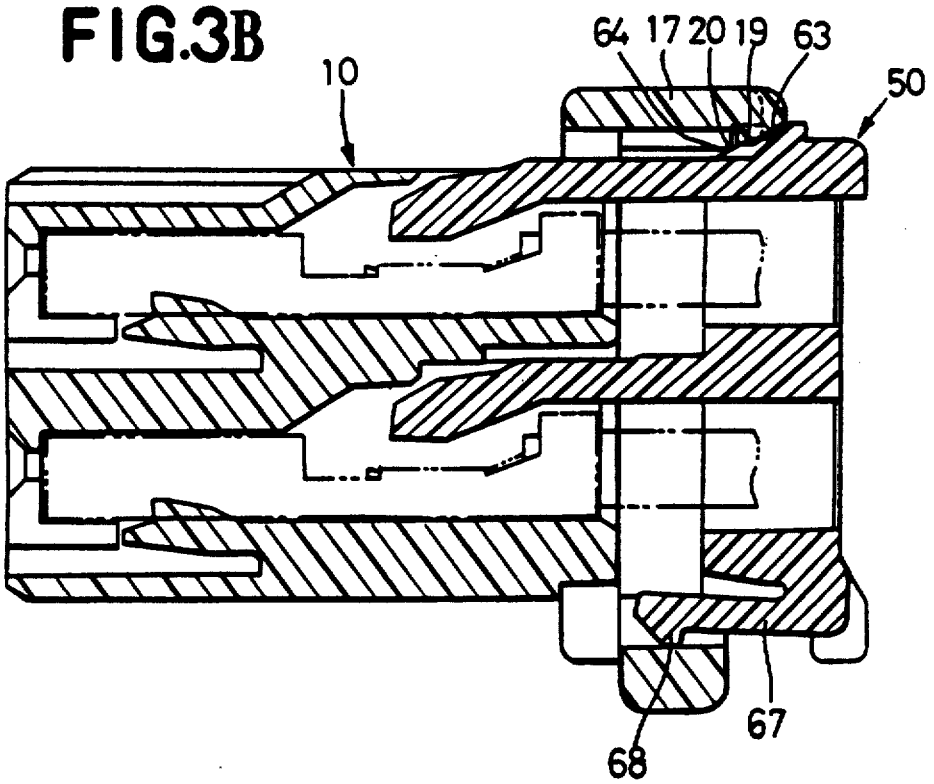
Figure 3C:
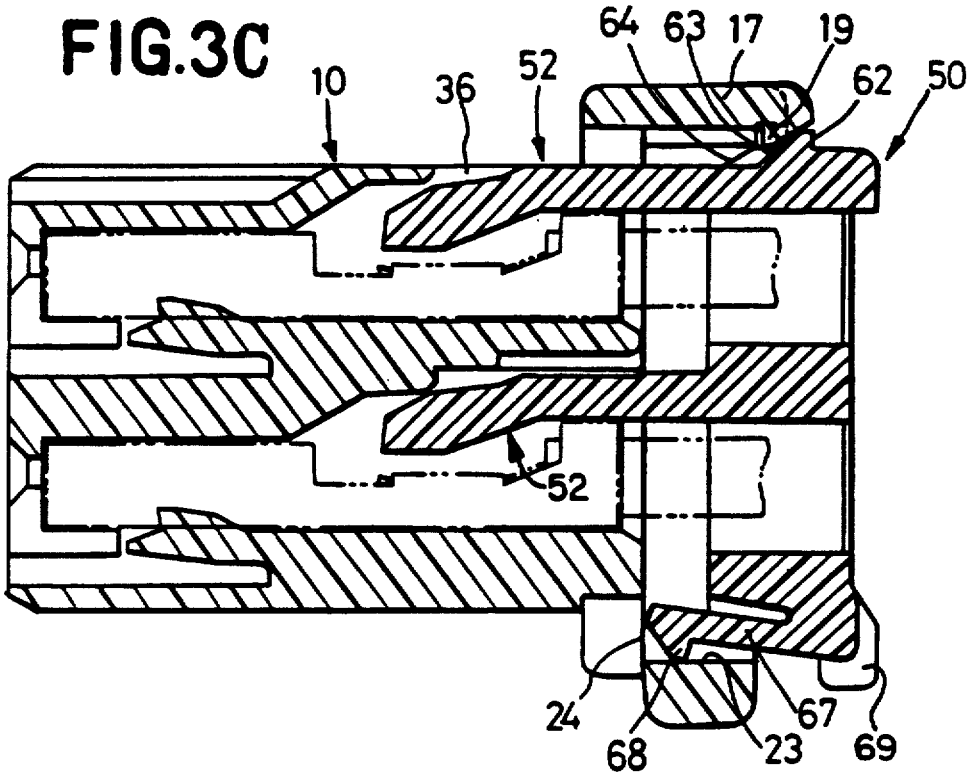
Figure 3D:
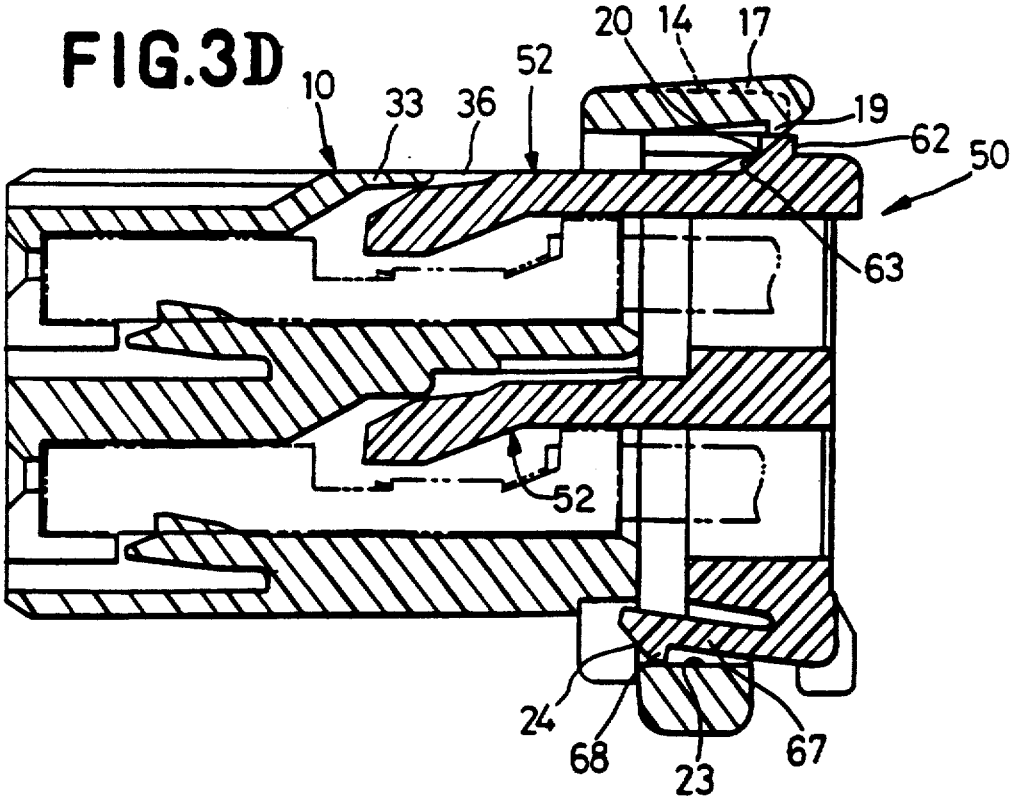

A groove 25 is formed in the upper wall of the housing 10 to accommodate therein a resilient latch 27 which is integral with the housing at the front end 26 and extending toward the rear end 12 within the groove 25. The latch 27 has a latching projection 28 and a push-down section 29 at the center and near the rear end 12 on the upper surface, respectively. The latching projection 28 engages a latching portion of a matable connector housing (not shown) that is complementary with the housing 10. Openings 31 are formed in the housing 10 at the front end 26 through which male contact terminals of the matable connector extend into the terminal-receiving cavities 11. A resilient housing lance 30 extend into each terminal-receiving cavity 11 from each horizontal center section 34 and each bottom wall 35 of the housing 10, as shown in FIGS. 2A and 3A. Guiding grooves 32 are formed in the bottom walls of the terminal-receiving cavities 11, as best shown in FIG. 1., for slidably guiding stabilizers (not shown) at the bottom wall of each terminal. Openings 36 are formed adjacent to the intersection of the upper portion 14 and the upper wall 33. Sloped surfaces 37 are formed at substantially the center portions of the upper wall 33 in each cavity 11. Also, similar sloped surfaces 37 are formed in the center section 34 in each cavity 11 after stepped portions 38.

Figure 2C:
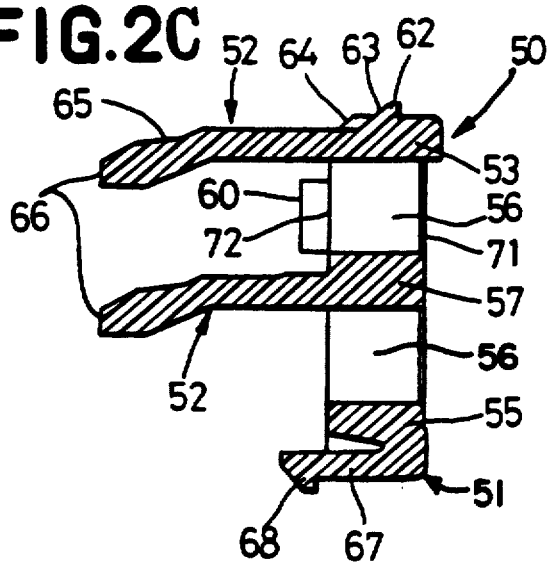
FIG. 2C is a cross-sectional view along line 2C—2C in FIG. 1.

In FIGS. 1 and 2C, the connector includes a dielectric latching member 50 comprising a frame section 51 and latching arms 52 equal in number to cavities 11. The frame section 51 comprises an upper section 53, side sections 54 and a bottom section 55 and has openings 56 equal in number to the terminal-receiving cavities 11 of the housing 10. Latching arms 52 extend from the upper section 53 and a horizontal central section 57. A groove 58 is formed in the upper central portion of the upper section 53 for mating with the section containing groove 25 in the housing 10. Resilient latching members 60 having externally-oriented hooks 61 are formed in the side sections 54 by slits 59. Latching projections 62 having sloped surfaces 63 are formed at a desired spacing on the upper section 53. Sloped surfaces 64 are formed on the inner side edge of the upper section 53 on both sides of the latching projections 62 for slidably contacting with the sliding sections 20 of the housing 10. A front end portion 65 of each latching arm 52 is bent downwardly to provide stepped upper surface. Resilient latching members 67 having hooks 68 are formed on the lower section 55 in such a manner to slide along grooves 23 and into openings 24 of the housing 10. A stop member 69 is provided on lower section 55 between the resilient latching members 67. Two elongated grooves 70 are formed along the bottom surface of the openings 56 for slidably guiding the stabilizers at the bottom side of each terminal. Ribs 73 are formed on the upper surfaces of the lower group of latching arms 52. Due to requirements of the housing 10, the lower group of latching arms is made thinner than that of the upper group of latching arms thereby requiring ribs 73.

Figure 4A:
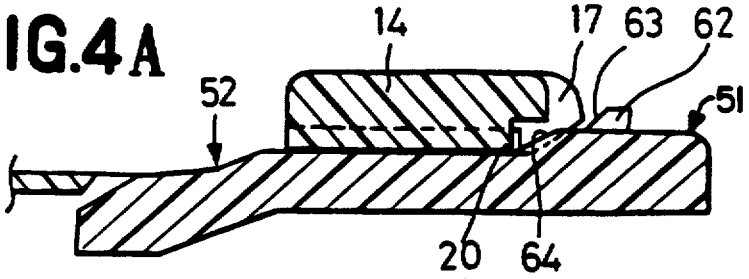
FIGS. 4A through 4E are enlarged part cross-sectional views at different positions from FIGS. 2A through 2C to illustrate the steps from the primary latching position and the secondary latching position between the latching member and the housing.
Figure 4B:
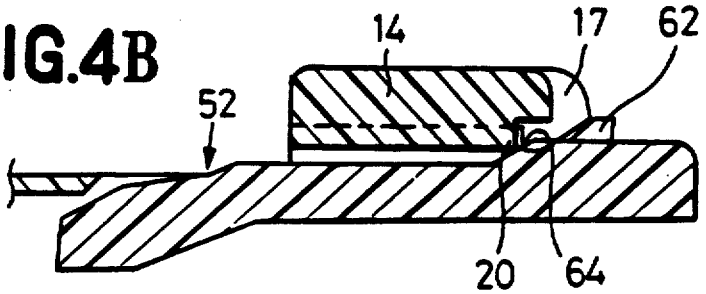
Figure 4C:
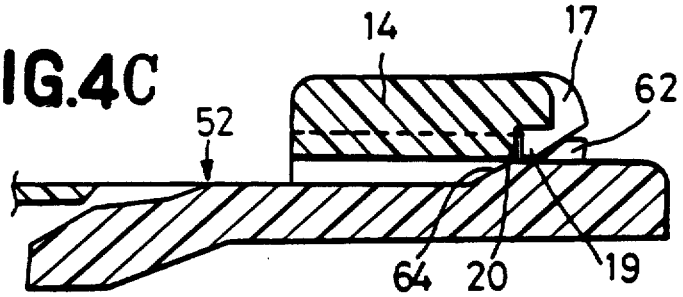
Figure 4D:
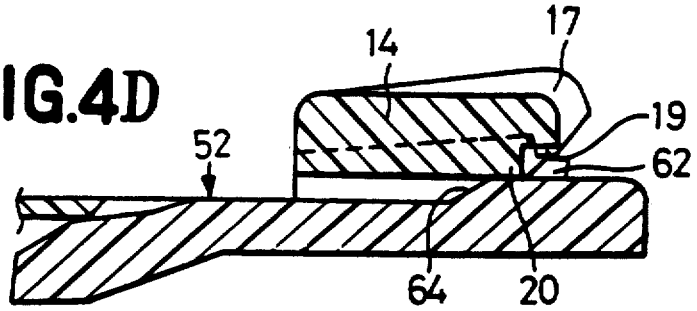

As shown in FIGS. 3A and 4A, firstly, the latching arms 52 of the latching member 50 are inserted in the respective terminal-receiving cavities 11 in the housing 10 for initially latching the latching member 50 to the housing 10. In the movement of the latching member 50 to reach the initial latching position, the hooks 61 (see FIG. 1) of the resilient latching members 60 at both side sections of the latching member 50 resiliently slide along the inner surfaces of the side sections 15 of the housing 10 until they are disposed in the latching openings 21 in the side sections. This indicates to the operator that the latching member 50 is at the initial latching position. In this position, the terminal-receiving cavities 11 at the rear end 12 of the housing 10 and the openings 56 in the latching member 50 are aligned. For example, for the terminal-receiving cavities 11 and the openings 56 in the upper row, the bottom surfaces of the terminal-receiving cavities 11 and the bottom surface 57a of the openings 56 are on the same horizontal plane. Thus, receptacle terminals 100 can be inserted in the terminal-receiving cavities 11 from the rear end 71 of the latching member 50 through the openings 56.

Each terminal 100 has an electrical contact section 101 to receive a male terminal of a matable connector, a wire-crimping section 102 to crimp to the stripped conductor of an electrical wire 150, an insulation-crimping section 103 to crimp to the insulation of the electrical wire 150, and a cut-away portion 106 in the bottom wall of the electrical contact section 101. Such insertion of the terminals 100 in the terminal-receiving cavities 11 is carried out against the resiliency of the resilient housing lances 30. When the terminals 100 are moved to their predetermined locations, the resilient lances 30 engage the cut-away portions 106 by their resiliency.

Figure 5:
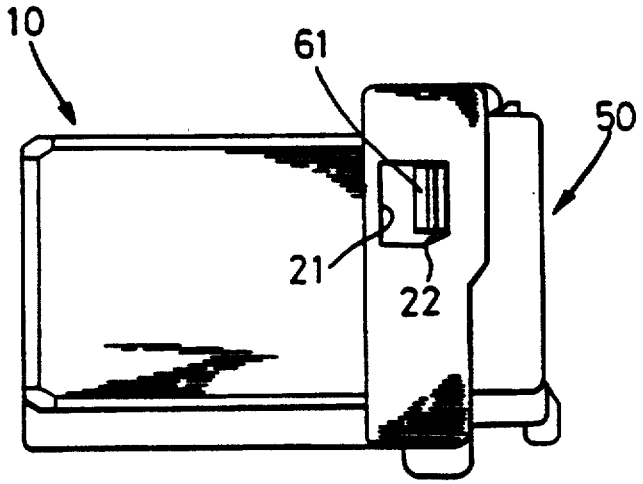
FIGS. 5 and 6 are side views of the housing and the latching member in the above primary and secondary latching positions, respectively.

In the initial latching position, the resilient latching members 17 of the housing 10 and the sliding sections 20 are not in engagement with the respective sloped surfaces 63, 64 of the latching member 50, but the hooks 68 of the resilient latching members 67 are located in the grooves 23 of the housing 10. As shown in FIGS. 3B through 3D and 4B through 4D, when the latching member 50 is further inserted in the housing 10, i.e., when the latching arms 52 are further inserted into the terminal-receiving cavities 11, the hooks 61 (see FIGS. 1 and 5) of the resilient latching members 60 at both side sections of the latching member 50 slide along the sloped surfaces 22 of the latching openings 21. When the hooks 61 touch the lower surfaces of the latching openings 21, the sliding surfaces 20 of the housing 10 slide along the sloped surfaces 64 of the latching member 50 and ride along the top surface thereof as the latching member 50 moves forward. Also, at the same time, the hooks 19 of the resilient latching members 17 of the housing 10 ride over the top surfaces of the latching projections 62 of the latching member 50 after sliding along the sloped surfaces 63, thereby upwardly deflecting the resilient latching members 17. Simultaneously, the resilient latching members 67 are forced upwardly as they slide along the grooves 23.

Figure 3E:
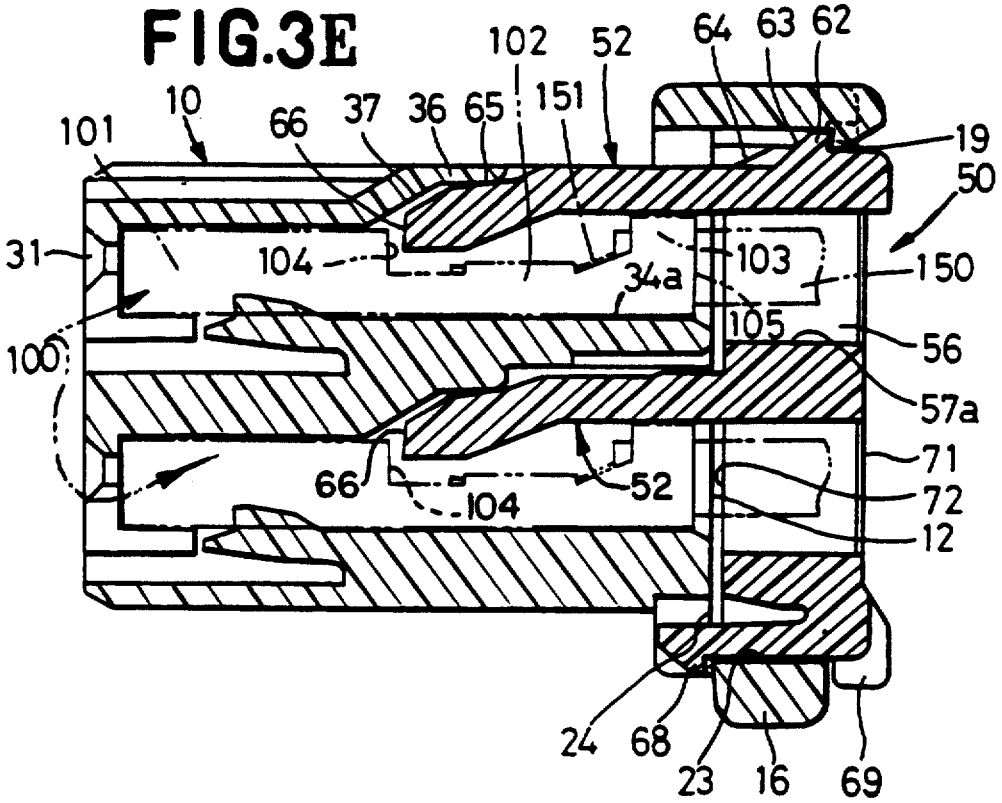
Figure 4E:
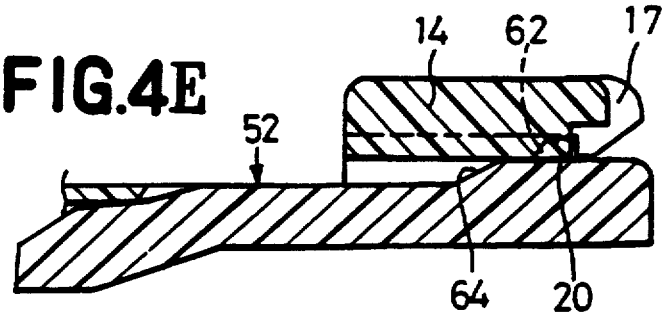
Figure 6:
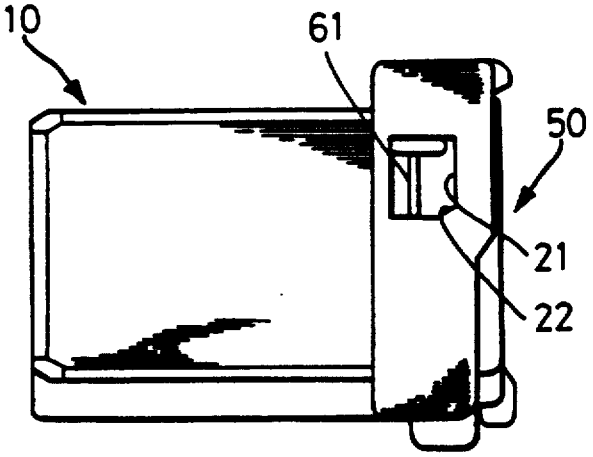

As shown in FIGS. 3E and 4E, when the latching arms 52 are further inserted into the terminal-receiving cavities 11, the sliding surfaces 20 slide along the top surface of the latching member 50 and the hooks 19 of the resilient latching members 17 ride over the latching projections 62 and engage the rear surfaces thereof. Simultaneously, the hooks 68 of the resilient latching members 67 pass through the openings 24, thereby returning to their initial position and engage with the lower portion 16. Then, the hooks 61 of the resilient latching members 60 move to the front surfaces of the latching openings 21 and engage therewith (see FIG. 6).

When the latching member 50 is secondarily latched with the housing 10 as described above, i.e., when the resilient latching arms 52 are completely inserted into the terminal-receiving cavities 11, the front ends 66 of the latching arms 52 are opposed to the inner ends 104 of the electrical contact sections 101 of the terminals 100. The front ends 66 of the latching arms 52 prevent the terminals 100 from being pulled out in the opposite direction to the insertion of the terminals 100. Under this condition, the rear end surface 12 of the housing 10 approaches the front surface 72 of the frame 51 of the latching member 50. The openings 56 are shifted downwardly from the openings at the rear end of the terminal-receiving cavities 11.

As best understood from FIGS. 3A through 3E (with reference to FIGS. 2A and 2B), the openings 36 and the sloped surfaces 37 are formed in the upper wall 33 of the housing 10 and the sloped surfaces 37 and the stepped portions 38 are formed in the center section 34. The front ends 65 of the latching arms 52 are bent downwardly as a result of the stepped upper and lower surfaces of the front ends 65. As the latching arms 52 are inserted into the terminal-receiving cavities 11, the latching arms 52 move into the terminal-receiving cavities 11 without positively engaging the upper walls 33 and the lower surfaces of the center section 34.

As described hereinbefore, the electrical connector according to the embodiment of this invention is completely assembled by inserting the terminals 100 into the terminal-receiving cavities 11 of the housing 10 and then inserting the latching member 50 into the housing 10. Such electrical connector is then mated with a complementary connector. The electrical connector 10 is latched with the complementary connector in such a manner that a latching section of the latter pushes the resilient lever 27 of the former downwardly and rides over the latching projection 28 for engagement therewith. Simultaneously, electrical contact sections of male contacts of the matable complementary connector are inserted through openings 31 into the electrical contact sections 101 of the receptacle terminals 100 of the connector of the present invention. For separating the connectors, the resilient lever 27 is pushed down at the push-down section 29.

According to the electrical connector of the present invention, the latching member can be pushed forward and down in the process of moving the latching member from the first position for the initial latching of the latching member with the housing to the second position for secondary latching. The latching arms of the latching member can be brought into engagement with the terminals inserted in the terminal-receiving cavities without forcing the latching arms to be deformed by the upper surfaces of the terminal-receiving cavities, thereby allowing the latching arms to be smoothly inserted in the housing without causing material fatigue or permanent deformation to the latching arms.

The latching member is secondarily latched with the housing by engaging at substantially the vertical center position of the latching member in the second position. This is especially effective to assure correct latching between the housing and the latching member and also between the terminals and the latching arms for a relatively long connector having a large number of terminals.

I claim:

1. In an electrical connector comprising a dielectric housing having a frame section and a plurality of terminal-receiving cavities to receive electrical terminals, and a dielectric latching member having a frame section provided with openings equal in number to said terminal-receiving cavities and latching arms extending from said frame section into said terminal-receiving cavities and equal in number to said terminal-receiving cavities, the electrical connector being characterized in that:

said housing and said latching member have first latching means at both sides of said housing and said latching member for initially latching said latching member to said housing at a first position;

said terminal-receiving cavities and said openings are aligned in such a manner that the electrical terminals may be inserted through said openings into said terminal-receiving cavities with said latching member in the first position;

said housing and said latching member being provided with slide means to move said latching member forwardly and downwardly to position the front ends of said latching arms adjacent with sections of the electrical terminals inserted in said terminal-receiving cavities in moving said latching member from the first position to a second position; and said housing and said latching member including second and third latching means at upper and lower ends between both sides of said housing and said latching member for secondary latching of said latching member to said housing in the second position and wherein said third latching means comprise resilient latching members having hooks positioned at the lower section of the frame section of said latching member and the lower portion of said frame section of said housing having grooves and openings with said latching member disposed in said grooves and said hooks extending through said openings and engaging said frame section of said housing at the second position.

2. An electrical connector of claim 1, characterized in that said first latching means comprises latching openings in both sides of said housing frame section extending to the rear end of said housing and resilient latching members formed at both sides of said frame section of said latching member and having hooks disposed in said latching openings.

3. An electrical connector of claim 1, characterized in that said slide means comprises sliding surfaces positioned at the upper portion of said housing frame section extending to the rear end of said housing, and sloped surfaces formed at the upper section of said frame section of said latching member with said sliding surfaces slidably engaging said sloped surfaces.

4. An electrical connector of claim 1, characterized in that said second latching means are provided at the upper section of said frame section of said latching member and said frame section at the back end of said housing, and said second latching means comprising resilient latching members having hooks at an upper portion of the frame section of said housing and latching projections positioned at the upper section of said frame section of said latching member and having sloped surfaces along which said hooks of said latching members slidably move by overriding the sloped surfaces and engaging rear surfaces of said latching projections.

5. An electrical connector, comprising:

a dielectric housing having a plurality of terminal-receiving cavities to receive electrical terminals therein;

a dielectric latching member having openings and latching arms equal to the number of terminal-receiving cavities;

first latching means on said housing and said latching member latching said latching member to said housing in a first position with said latching arms extending along the terminal-receiving cavities and said openings aligned with said terminal-receiving cavities so that the electrical terminals can be inserted through said openings into said terminal-receiving cavities;

means on said housing and said latching member moving said latching member downwardly as said latching member is moved inwardly from said first position to a second position within said housing thereby positioning the front ends of said latching arms adjacent sections of the electrical terminals; and second latching means on said housing and said latching member latching said latching member at said second position, said second latching means comprise first resilient latching members on said housing engagable with latching projections on said latching member and second resilient latching members on said latching member movable along grooves in said housing and engagable with latching surfaces on said housing.

6. An electrical connector as claimed in claim 5, wherein said first latching means includes latching openings in the sides of said housing and resilient latching members including hooks at the sides of said latching member with the hooks disposed in the latching openings.

7. An electrical connector as claimed in claim 5, wherein said moving means comprise sliding surfaces on said housing engagable with sloped surfaces on said latching member and latching openings in the sides of said housing having bottom sloped surfaces along which hooks of resilient latching members of said latching member move.

8. An electrical connector as claimed in claim 5, wherein said first latching means are located at the sides of said housing and said latching member and said section latching means are located at the upper and lower sections of said housing and said latching member between said sides.

*9. An electrical connector housing for receiving and securing electrical terminals therein, comprising:*

*a dielectric housing member having a plurality of terminal-receiving passages for receiving electrical terminals therein and a latch-receiving frame at one end of said housing member;*

*a dielectric latching member having a frame section provided with openings and latching arms, said latching arms extending outwardly from said frame section;*

*first, second and third cooperating latching members on said latch-receiving frame and said frame section for maintaining said frame section adjacent said latch-receiving frame at a first position with said openings of said latching member and said terminal-receiving passages being aligned and said latching arms extending along said terminal-receiving passages so that the electrical terminals can be inserted through said openings into the terminal-receiving passages; and*

*said second and third cooperating latching members controlling movement of said frame section relative to said latch-receiving frame from said first position to a second position whereby the openings and terminal-receiving passages are offset, the latching arms are positioned adjacent sections of the terminals to secure them in said terminal-receiving passages and said second and third cooperating latching members latching said latching member at said second position.*

*10. An electrical connector housing as claimed in claim 9, wherein said first, second and third latching members include interengaging latching elements that maintain said dielectric latching member at said first position and up inward movement of said dielectric latching member within said housing member to said second position, said interengaging latching elements of said second and third latching members control said inward movement.*

*11. An electrical connector housing as claimed in claim 9, wherein said first latching members maintain said dielectric latching member at said first position with said second and third latching members being engaged but unlatched.*

*12. An electrical connector housing as claimed in claim 11, wherein said second and third latching members con-*

*trol inward movement of said dielectric latching member within said housing member to said second position.*

*13. An electrical connector housing as claimed in claim 9, wherein said first latching members comprise resilient latching members at the sides of said frame section matable with latching openings in the sides of said latch-receiving frame.*

*14. An electrical connector housing as claimed in claim 9, wherein one of said second and third cooperating latching members include resilient latching members on one and the other of said dielectric latching member and said housing member latchably engageable with latching sections on one and the other of said dielectric latching member and said housing member.*

*15. An electrical connector housing as claimed in claim 9, wherein one of said second and third cooperating latching members include at least one latching element on said dielectric latching member that is latchably engageable with an opening in said housing member.*

*16. An electrical connector housing as claimed in claim 9, wherein said housing member has lance members in said terminal-receiving passages for engagement with the electrical terminals when positioned within the terminal-receiving passages.*

*17. An electrical connector housing as claimed in claim 9, wherein said latch-receiving section comprises a latch-receiving frame section in which said frame section of said latching member is received.*

* * * * *